United States Patent
Ohyama et al.

(10) Patent No.: US 11,187,533 B2
(45) Date of Patent: Nov. 30, 2021

(54) ADVANCEMENT DIRECTION CALCULATION DEVICE, ADVANCEMENT DIRECTION DETERMINATION METHOD, AND CONTROL PROGRAM

(71) Applicant: SHARP KABUSHIKI KAISHA, Sakai (JP)

(72) Inventors: Shigeo Ohyama, Sakai (JP); Shigeyuki Wakita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 124 days.

(21) Appl. No.: 16/497,706

(22) PCT Filed: Mar. 2, 2018

(86) PCT No.: PCT/JP2018/008152
§ 371 (c)(1),
(2) Date: Sep. 25, 2019

(87) PCT Pub. No.: WO2018/186077
PCT Pub. Date: Oct. 11, 2018

(65) Prior Publication Data
US 2020/0033126 A1    Jan. 30, 2020

(30) Foreign Application Priority Data
Apr. 5, 2017  (JP) .............................. JP2017-075360

(51) Int. Cl.
*G01C 21/16* (2006.01)
*G01C 21/26* (2006.01)
*G01P 15/18* (2013.01)

(52) U.S. Cl.
CPC ............. *G01C 21/16* (2013.01); *G01C 21/26* (2013.01); *G01P 15/18* (2013.01)

(58) Field of Classification Search
CPC ........ G01C 21/16; G01C 21/26; G01C 21/10; G01C 21/12; G01P 15/18
See application file for complete search history.

(56) References Cited

U.S. PATENT DOCUMENTS

2003/0191582 A1 * 10/2003 Terada .................... G01C 21/20
                                                                 701/500
2009/0143972 A1   6/2009 Kitamura et al.
(Continued)

FOREIGN PATENT DOCUMENTS

CN    105102928 A    11/2015
JP    2009-186376 A    8/2009
(Continued)

*Primary Examiner* — Manuel L Barbee
(74) *Attorney, Agent, or Firm* — ScienBiziP, P.C.

(57) ABSTRACT

An advancement direction of a user who is walking is calculated with high accuracy. A period specifying unit specifies at least a part of a deceleration period, during which a horizontal component of acceleration is negative, as a stable deceleration period on the basis of a change of a vertical component of the acceleration, a deceleration vector calculation unit calculates a deceleration vector which indicates a deceleration direction in the stable deceleration period, and an advancement direction determination unit determines an advancement direction of a user on the basis of the deceleration vector.

12 Claims, 5 Drawing Sheets

(56) References Cited

U.S. PATENT DOCUMENTS

| | | | |
|---|---|---|---|
| 2010/0191501 A1 | 7/2010 | Kitamura et al. | |
| 2014/0088867 A1* | 3/2014 | Takaoka | G01C 21/10 |
| | | | 701/526 |
| 2015/0354967 A1* | 12/2015 | Matsushita | G01C 21/165 |
| | | | 702/150 |
| 2019/0323840 A1* | 10/2019 | Ohyama | G01C 19/02 |

FOREIGN PATENT DOCUMENTS

| | | |
|---|---|---|
| JP | 2012-021870 A | 2/2012 |
| JP | 2013-160657 A | 8/2013 |
| JP | 2014-167460 A | 9/2014 |
| KR | 2015-0099863 A | 9/2015 |
| WO | 2006/104140 A1 | 10/2006 |
| WO | 2014/119799 A1 | 8/2014 |

\* cited by examiner

ADVANCEMENT DIRECTION CALCULATION DEVICE, ADVANCEMENT DIRECTION DETERMINATION METHOD, AND CONTROL PROGRAM

TECHNICAL FIELD

The present invention relates to an advancement direction calculation device, an advancement direction determination method, and a control program, and relates to, for example, an advancement direction calculation device that determines an advancement direction of a user for pedestrian dead reckoning (PDR).

BACKGROUND ART

Conventionally, there has been a technique by which a current position specified with use of positional information that is received from GPS (Global Positioning System). For example, a portable device such as a smartphone is implemented with a pedestrian navigation application that guides a user on the basis of positional information which is received from GPS by the portable device. However, in a case where the user stays indoors or in an underground shopping mall, it is difficult to receive a radio wave from GPS by the portable device. In this case, the pedestrian navigation application calculates a current position of the user by pedestrian dead reckoning (for example, PTL 1).

Typically, in pedestrian dead reckoning, an advancement direction and a step of a user are calculated every one-step movement of the user, a distance by which the user has moved till then and a direction in which the user has moved are integrated, and a current position of the user is thereby calculated. Accordingly, in pedestrian dead reckoning, a process in which an advancement direction of the user at a time of a walking operation is determined is particularly important. The walking operation seems to be performed substantially as a uniform motion, but, actually, a deceleration motion which is performed when a foot of the user lands and an acceleration motion which is performed when the foot of the user kicks a surface of the ground are periodically and alternately repeated. Various techniques by which an advancement direction of a user is calculated by using such characteristics of the walking operation are proposed.

For example, PTL 2 discloses a technique by which a frequency component related to a walk of a user is extracted from a sensor value of an acceleration sensor and an advancement direction of the user is determined on the basis of the extracted frequency component. PTL 3 discloses a technique by which a direction of a vector that halves an angle formed by an acceleration vector in a horizontal direction when a user steps forward with his/her left foot and an acceleration vector in the horizontal direction when the user steps forward with his/her right foot is calculated as an advancement direction of the user. PTL 4 discloses a technique by which an acceleration component related to a walk of a user is extracted by removing a DC component, that is, a component a frequency of which is 0 from acceleration that is generated in a portable device.

CITATION LIST

Patent Literature

PTL 1: Japanese Unexamined Patent Application Publication No. 2009-186376 (published on Aug. 20, 2009)

PTL 2: International Publication. No. WO2006/104140 (published on Oct. 5, 2006)

PTL 3: Japanese Unexamined Patent Application Publication No. 2012-21870 (published on Feb. 2, 2012)

PTL 4: Japanese Unexamined Patent Application Publication No. 2013-160657 (published on Aug. 19, 2013)

SUMMARY OF INVENTION

Technical Problem

However, in the technique described in PTL 2, data of sensor values of at least several steps is always accumulated in a portable device, so that a memory capacity required in the portable device is tremendously increased. Furthermore, the technique described in PTL 2 requires a great number of resources such as a cloud service. Therefore, the technique described in PTL 2 is not practical.

In the technique described in PTL 3, although horizontal components related to a walk of the user are required to be extracted from acceleration vectors, since the horizontal components related to the walk of the user are extremely small, it is difficult to perform separation from an unnecessary horizontal component based on a shake of a body or the like. It is difficult to accurately separate a horizontal component of the acceleration related to the walk of the user from an unnecessary component also in the technique described in PTL 4. Accordingly, in the techniques described in PTLs above, it is difficult to calculate, with high accuracy, an advancement direction of a user who is walking.

An aspect of the invention aims to calculate an advancement direction of a user with high accuracy.

Solution to Problem

In order to solve the aforementioned problems, an advancement direction calculation device according to an aspect of the invention includes: an acceleration sensor that detects acceleration of three-axis directions, which is generated by a user; a period specifying unit that specifies at least a part of a deceleration period, during which a horizontal component of the acceleration detected by the acceleration sensor is negative, as a stable deceleration period on the basis of a change of a vertical component of the acceleration detected by the acceleration sensor; a deceleration vector calculation unit that calculates deceleration vector which indicates a deceleration direction of the user in a horizontal plane in the stable deceleration period specified by the period specifying unit; and an advancement direction determination unit that determines an advancement direction of the user on the basis of the deceleration vector calculated by the deceleration vector calculation unit.

In order to solve the aforementioned problems, an advancement direction determination method according to an aspect of the invention is an advancement direction determination method performed by an advancement direction calculation device including an acceleration sensor that detects acceleration generated by a user, and the advancement direction determination method includes: a walking operation analysis step of specifying at least a part of a deceleration period, during which a horizontal component of the acceleration detected by the acceleration sensor is negative, as a stable deceleration period on the basis of a change of a vertical component of the acceleration detected by the acceleration sensor; a deceleration vector calculation step of calculating a deceleration vector which indicates a deceleration direction of the user in a horizontal plane in the stable deceleration period specified at the walking operation analysis step; and an advancement direction determination step of determining an advancement direction of the user on the basis of the deceleration vector calculated at the deceleration vector calculation step.

Advantageous Effects of Invention

According to an aspect of the invention, it is possible to calculate an advancement direction of a user who is walking with high accuracy.

DESCRIPTION OF EMBODIMENTS

Embodiment 1

Embodiment 1 of the invention will be described below with reference to drawings.

(Configuration of Advancement Direction Calculation Device 1)

Figure 1:
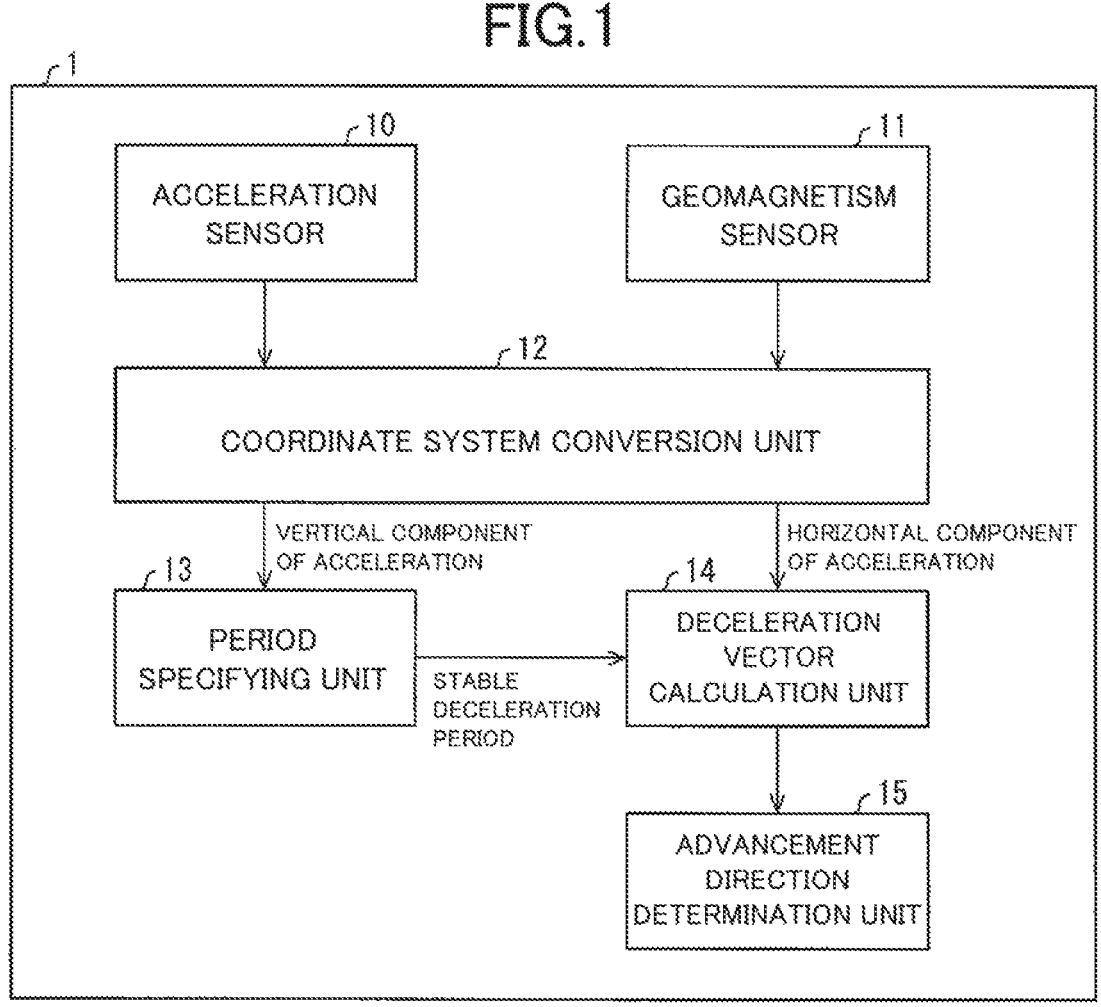
FIG. 1 is a block diagram of an advancement direction calculation device according to Embodiment 1.

FIG. 1 illustrates a configuration of an advancement direction calculation device 1 according to Embodiment 1. As illustrated in FIG. 1, the advancement direction calculation device 1 provided with an acceleration sensor 10, a geomagnetism sensor 11, a coordinate conversion unit 12, a period specifying unit 13, a deceleration vector calculation unit 14, and an advancement direction determination unit 15.

The acceleration sensor 10 detects acceleration of the advancement direction calculation device 1 in three-axis (hereinafter, called XYZ-axis) directions which are orthogonal to each other. The acceleration sensor 10 transmits, to the coordinate conversion unit 12, acceleration data that indicates the detected acceleration of the advancement direction calculation device 1. The geomagnetism sensor 11 detects intensity of geomagnetism in the XYZ-axis directions which are orthogonal to each other. The geomagnetism sensor transmits, to the coordinate conversion unit 12, geomagnetism data that indicates the detected intensity of geomagnetism.

The coordinate conversion unit 12, the period specifying unit 13, the deceleration vector calculation unit 14, and the advancement direction determination unit 15 determine an advancement direction of a user on the basis of the acceleration data acquired from the acceleration sensor 10 and the geomagnetism data acquired from the geomagnetism sensor 11 (described below). The coordinate conversion unit 12, the period specifying unit 13, the deceleration vector calculation unit 14, and the advancement direction determination unit 15 are achieved by a CPU (Central Processing Unit) and a memory that are provided in the advancement direction calculation device 1.

In FIG. 1, the acceleration sensor 10 and the geomagnetism sensor 11 are represented as different pieces of hardware. However, the advancement direction calculation device 1 may include a six-axis sensor in which the acceleration sensor 10 and the geomagnetism sensor 11 are assembled in one package, or may also include a different kind of sensor such as a gyro sensor in addition to the acceleration sensor 10 and the geomagnetism sensor 11. Moreover, the coordinate conversion unit 12, the period specifying unit 13, the deceleration vector calculation unit 14, and the advancement direction determination unit 15 are illustrated in FIG. 1 as functional blocks that are independent from each other, but are able to be achieved also as software of one MCU (micro controller unit).

(Flow of Advancement Direction Determination Method)

Figure 2:
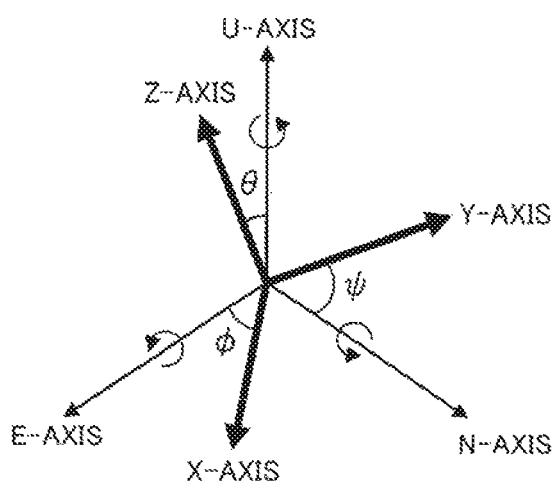
FIG. 2 is a view illustrating a relation between axis directions of an XYZ coordinate system and axis directions of an ENU coordinate system.
Figure 3:
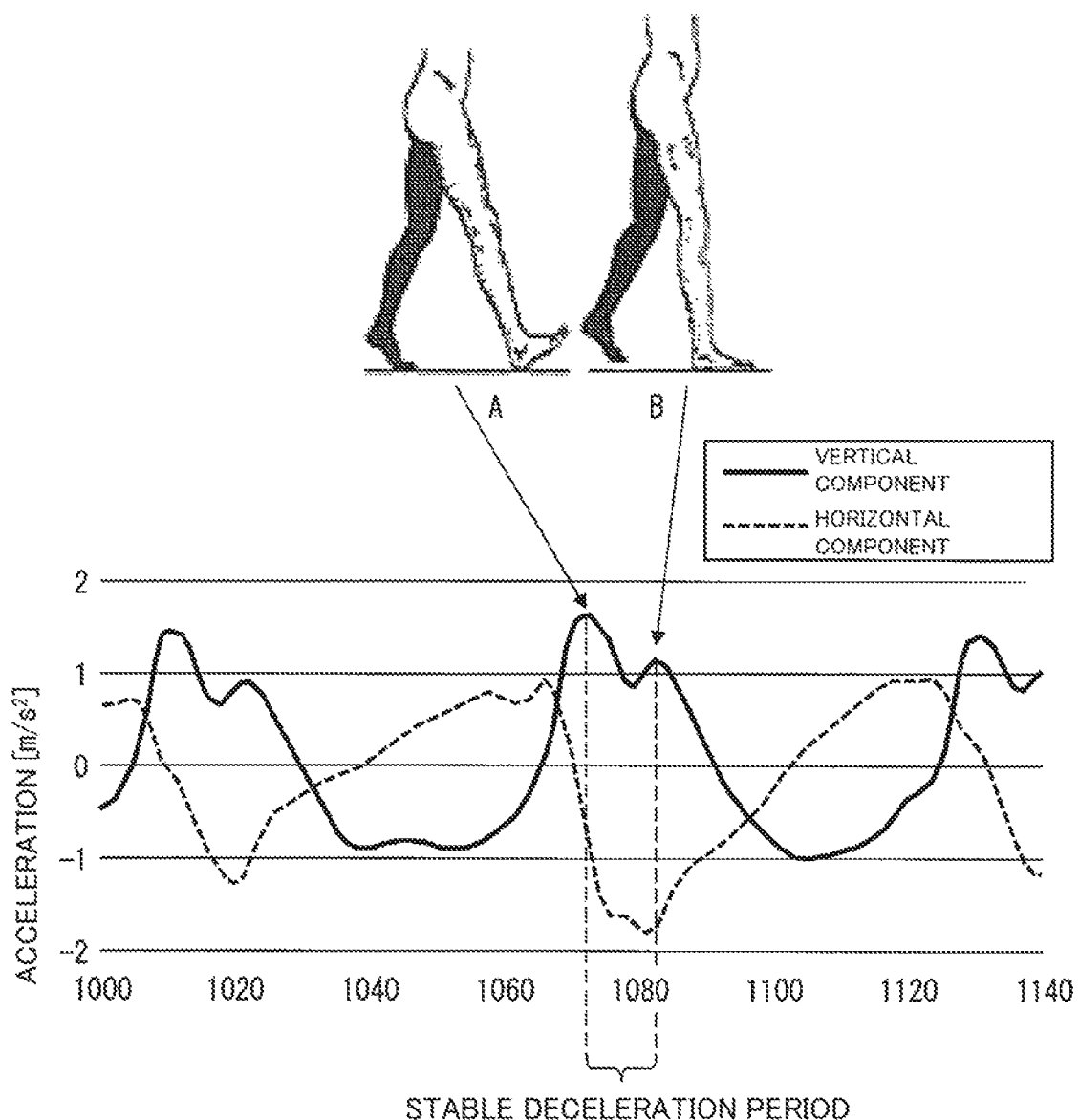
FIG. 3 is a view illustrating a change of acceleration generated by a user who is walking.
Figure 4:
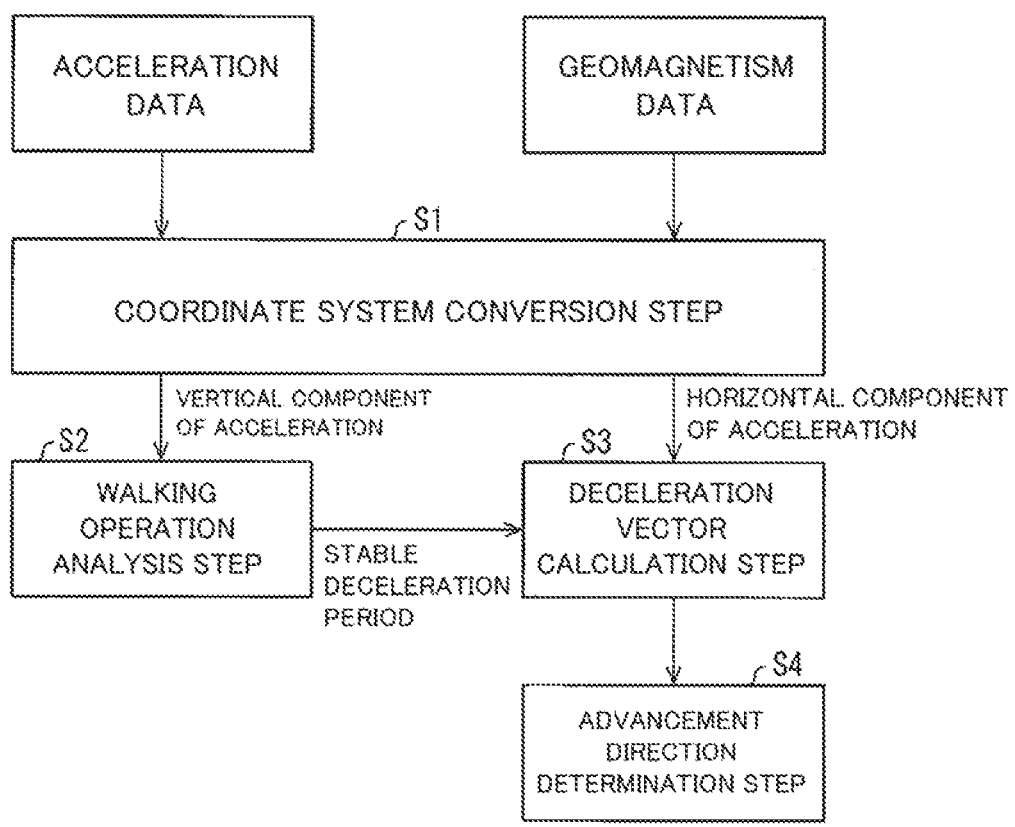
FIG. 4 is a flowchart illustrating a flow of an advancement direction determination method according to Embodiment 1.

A flow of a method of determining an advancement direction of a user by the coordinate conversion unit 12, the period specifying unit 13, the deceleration vector calculation unit 14, and the advancement direction determination unit 15 will be described with reference to FIGS. 2 to 4. FIG. 2 is a view illustrating a relation between an XYZ coordinate system and an ENU coordinate system. FIG. 3 illustrates an example of a change of a vertical component and a horizontal component of an acceleration vector during a time when a user is walking. FIG. 4 is a flowchart illustrating the flow of the method of determining an advancement direction of a user.

As illustrated in FIG. 4, the method of determining an advancement direction of a user includes steps S1 to S4 (S1). Hereinafter, details of each step of S1 to S4 will be described in order.

[S1. Coordinate Conversion]

Here, the acceleration data of the three-axis directions, which is acquired from the acceleration sensor 10 by the coordinate conversion unit 12, is referred to as an acceleration vector. Moreover, the geomagnetism data of the three-axis directions, which is acquired from the geomagnetism sensor 11 by the coordinate conversion unit 12, is referred to as a geomagnetism vector.

As indicated by S1 in FIG. 4, the coordinate conversion unit 12 of the advancement direction calculation device 1 converts the acceleration vector in the XYZ coordinate system into an acceleration vector in the ENU coordinate system. The ENU coordinate system is referred to also as a horizontal rectangular coordinate system. In the ENU coordinate system, when viewed from the advancement direction calculation device 1 (user), an east direction is a positive direction of an E-axis, a north direction is a positive direction of an N-axis, and a zenithal direction is a positive direction of a U-axis. That is, the ENU coordinate system is constituted by one axis (U-axis) in a vertical direction and two axes (E-axis and N-axis) in a horizontal plane. The XYZ-axes and the ENU-axes are not always coincident depending on an attitude in which the user holds the advancement direction calculation device 1.

Specifically, first, the coordinate conversion unit 12 acquires the acceleration vector in the XYZ coordinate system from the acceleration sensor 10 when the user is at rest. When the user is at rest, the acceleration sensor 10 detects only gravity acceleration, so that the acceleration vector points to the vertical direction. The vertical direction corresponds to a U-axis direction in the ENU coordinate system. Accordingly, in a case where a Z-axis direction and the U-axis direction are coincident, an X component and a Y component are zero in the acceleration vector in the vertical direction in the XYZ coordinate system. In other words, in a case where at least one of the X component and the Y component is not zero in the acceleration vector in the XYZ coordinate system, there is a difference between the Z-axis direction and the U-axis direction. Therefore, the coordinate conversion unit 12 is able to calculate the difference between the Z-axis direction and the U-axis direction on the basis of the X component and the Y component in the acceleration vector in the XYZ coordinate system.

Next, the coordinate conversion unit 12 acquires the geomagnetism vector in the XYZ coordinate system from the geomagnetism sensor 11. The geomagnetism vector always includes a magnetic north component and a vertically downward component. The magnetic north component of the geomagnetism vector corresponds to a component of the positive direction of the N-axis in the ENU coordinate system. Moreover, the vertically downward component of the geomagnetism vector corresponds to a component in a negative direction of the U-axis. The coordinate conversion unit 12 removes the vertically downward component from the geomagnetism vector. The coordinate conversion unit 12 is thereby able to specify an N-axis direction in the ENU coordinate system. The coordinate conversion unit 12 calculates a difference between the specified N-axis direction and a Y-axis direction. Further, when the difference between the U-axis direction and the Z-axis direction and the difference between the N-axis direction and the Y-axis direction are calculated in this manner, the coordinate conversion unit 12 is able to calculate a difference between an E-axis direction and an X-axis direction as well. Hereinafter, a difference between the XYZ-axes and the ENU-axes is called an attitude in some cases.

As illustrated in FIG. 2, the difference between the XYZ-axes and the ENU-axes, that is, the attitude is expressed by a roll ($\phi$), a yaw ($\psi$), and a pitch ($\theta$). The roll ($\phi$), the yaw ($\psi$), and the pitch ($\theta$) are called Euler angles. The roll ($\phi$) expresses a difference between an X-axis and the E-axis. The yaw ($\psi$) expresses a difference between a Y-axis and the N-axis. The pitch ($\theta$) expresses a difference between a Z-axis and the U-axis.

The coordinate conversion unit 12 converts an acceleration vector (Ax, Ay, Az) in the XYZ coordinate system into an acceleration vector (Ae, An, Au) in the ENU coordinate system with use of a rotating matrix corresponding to the attitude. The following mathematical formula (1) represents the rotating matrix with use of Euler angles (roll ($\phi$), pitch ($\theta$), and yaw ($\psi$)).

[Math. 1]

mathematical formula (1)

$$\begin{pmatrix} Ae \\ An \\ Au \end{pmatrix} = \begin{bmatrix} \cos\psi\cos\theta\cos\varphi - \sin\psi\sin\varphi & -\sin\psi\cos\theta\cos\varphi - \cos\psi\sin\varphi & \sin\theta\cos\varphi \\ \cos\psi\cos\theta\sin\varphi - \sin\psi\cos\varphi & -\sin\psi\cos\theta\sin\varphi + \cos\psi\cos\varphi & \sin\theta\sin\varphi \\ -\cos\psi\sin\theta & \sin\psi\sin\theta & \cos\theta \end{bmatrix} \begin{pmatrix} Ax \\ Ay \\ Az \end{pmatrix}$$

By removing a U component from the acceleration vector (Ae, An, Au) in the ENU coordinate system, the coordinate conversion unit 12 is able to obtain a horizontal component (An, Au) of the acceleration vector. Moreover, by extracting the U component from the acceleration vector (Ae, An, Au) in the ENU coordinate system, it is possible to obtain a vertical component Ae of the acceleration vector.

The coordinate conversion unit 12 transmits, to the period specifying unit 13, data of the vertical component and the horizontal component of the acceleration vector, which are calculated in this manner.

Note that, when a user is walking, the advancement direction calculation device 1 keeps moving, so that the coordinate conversion unit 12 is required to continuously calculate an attitude, while the user is walking. The coordinate conversion unit 12 is able to calculate the attitude on the basis of the data acquired from the acceleration sensor and the geomagnetism sensor. However, in a case where the advancement direction calculation device 1 is provided with a gyro sensor, the coordinate conversion unit 12 is able to calculate the attitude more accurately by using data acquired from the gyro sensor in combination.

[S2. Analysis of Walking Operation (Walking Operation Analysis Step)]

As indicated by 32 in FIG. 4, the period specifying unit 13 of the advancement direction calculation device 1 analyzes the data of the vertical component and the horizontal component of the acceleration vector, which is acquired from the coordinate conversion unit 12, and thereby specifies a stable deceleration period. The stable deceleration period here means (i) at least a part of a deceleration period during which the horizontal component of the acceleration vector is negative and (ii) a period from a time point when the vertical component of the acceleration vector has a first local maximum value to a time point when the vertical component has a second local maximum value. As described below, the stable deceleration period corresponds to a period during which both feet of a user are in contact with the ground. The period specifying unit 13 transmits information of the specified stable deceleration period to the deceleration vector calculation unit 14.

FIG. 3 illustrates the example of the change of the vertical component and the horizontal component of the acceleration vector during a time when a user is walking. Here, attention is paid to an acceleration vector in a period from a point A (first time point) to a point B (second time point) which are illustrated in FIG. 3. The period from the point A to the point B is the stable deceleration period described above.

As illustrated in FIG. 3, the point A which is a start point of the stable deceleration period is a time point when a heel of one foot (foot which steps forward) of the user becomes in contact with the ground. At this time, the one foot of the user, which becomes in contact with the ground, receives a reaction force from a surface of the ground. Therefore, the vertical component the acceleration vector has a first peak (corresponding to the first local maximum value described above), which projects upward, at the point A. After the point A, the vertical component of the acceleration vector decreases once, and thereafter increases again. The point B which is an end point of the stable deceleration period is a time point when the user kicks the surface of the ground by the other foot (hind foot) or a time point when a heel of the hind foot takes off. At this time, the other one foot of the user, which kicks the surface of the ground, receives a reaction force from the surface of the ground. Therefore, the vertical component of the acceleration vector has a second peak (corresponding to the second local maximum value described above), which projects upward, at the point B. The stable deceleration period is able to be referred to also as a period from a time point when a heel of one foot of the user becomes in contact with the ground to a time point when a heel of the other foot of the user takes off. Alternatively, the stable deceleration period is able to be referred to also as a period during which both feet of the user are in contact with the ground.

As illustrated in FIG. 3, the horizontal component of the acceleration vector is negative in the stable deceleration period. Moreover, as seen from FIG. 3, the user drastically decelerates in the stable deceleration period, so that the acceleration vector has a relatively great value. Further, since the both feet of the user are in contact with the ground in the stable deceleration period, a body of the user is relatively stable, so that a motion such as a roll of the body of the user, which has nothing to do with a walk of the user, is small. Accordingly, in the stable deceleration period, since being mainly based on the walk of the user, acceleration of the user in the horizontal direction is generated in a direction which is almost opposite to an advancement direction (right direction in FIG. 3) of the user.

[S3. Calculation of Deceleration Vector (Deceleration Vector Calculation Step)]

As indicated by S3 in FIG. 4, the deceleration vector calculation unit 14 of the advancement direction calculation device 1 acquires information of the stable deceleration period from the period specifying unit 13. The deceleration vector calculation unit 14 integrates the horizontal component of the acceleration vector in the stable deceleration period to thereby calculate a deceleration vector in the stable deceleration period. A direction of the deceleration vector is coincident with an advancement direction of the user in a horizontal plane. The deceleration vector calculation unit 14 transmits information of the calculated deceleration vector to the advancement direction determination unit 15.

As described above, a motion such as a roll of the body of the user is small in the stable deceleration period. That is, the horizontal component of the acceleration vector in the stable deceleration period is almost based on a walk of the user. Thus, an S/N ratio of the deceleration vector calculated by the deceleration vector calculation unit 14 is high. That is to say, the deceleration vector calculation unit 14 is able to calculate, with high accuracy, the deceleration vector based on the walk of the user.

[S4. Determination of Advancement Direction (Advancement Direction Determination Step)]

As indicated by S4 in FIG. 4, the advancement direction determination unit 15 of the advancement direction calculation device 1 determines the advancement direction of the user on the basis of the deceleration vector calculated by the deceleration vector calculation unit 14. Specifically, the advancement direction determination unit 15 determinates a direction opposite to the direction of the deceleration vector as the advancement direction of the user.

As described above, the S/N ratio of the deceleration vector calculated by the deceleration vector calculation unit 14 is high, so that the advancement direction determination unit 15 is able to determine, with high accuracy, the advancement direction of the user on the basis of the deceleration vector.

Embodiment 2

Another embodiment of the invention will be described as follows with reference to FIGS. 5 to 7. Note that, for convenience of description, the same reference signs will be assigned to members having the same functions as those of members described in the embodiment described above, and description thereof will be omitted.

Embodiment 2 which is described here is different from Embodiment 1, which is described above, in a method of separating a vertical component and a horizontal component of acceleration generated by a user.

(Configuration of advancement direction calculation device 2)

Figure 5:
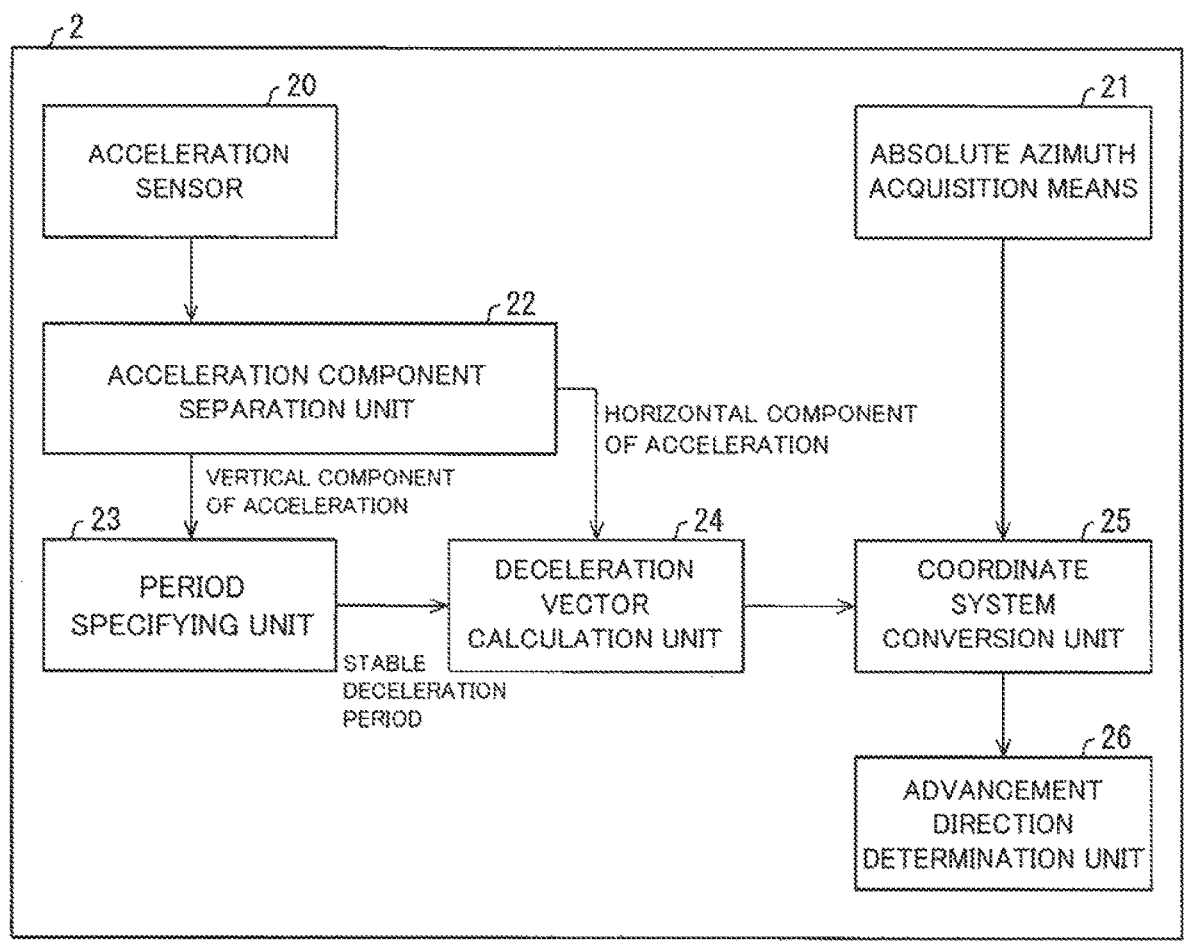
FIG. 5 is a block diagram of an advancement direction calculation device according to Embodiment 2.
Figure 6:
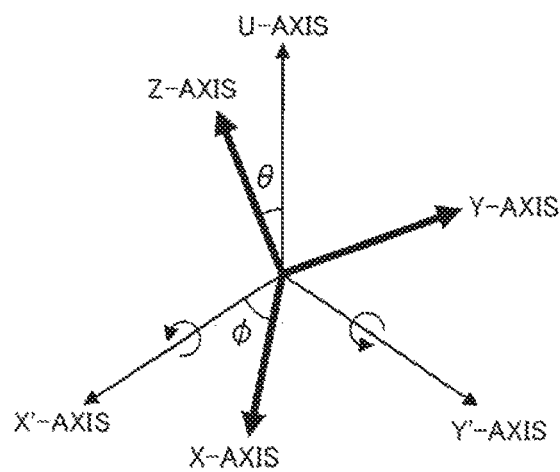
FIG. 6 is a view illustrating a relation between axis directions of an XYZ coordinate system and axis directions of an X'Y'U coordinate system.

FIG. 5 illustrates a configuration of an advancement direction calculation device 2 according to Embodiment 2. As illustrated in FIG. 5, the advancement direction calculation device 2 is provided with an acceleration sensor 20, an absolute azimuth acquisition means 21 (azimuth information acquisition unit), an acceleration component separation unit 22, a period specifying unit 23, a deceleration vector calculation unit 24, a coordinate system conversion unit 25, and an advancement direction determination unit 26.

The acceleration sensor 20 detects acceleration of the advancement direction calculation device 2 in the XYZ-axis directions which are orthogonal to each other. The acceleration sensor 20 transmits information of the detected acceleration of the advancement direction calculation device to the acceleration component separation unit 22 as acceleration data.

The absolute azimuth acquisition means 21, the acceleration component separation unit 22, the period specifying unit 23, the deceleration vector calculation nit 24, the coordinate system conversion unit 25, and the advancement direction determination unit 26 determine an advancement direction of a user on the basis of the acceleration data acquired from the acceleration sensor 20 (described below). The absolute azimuth acquisition means 21, the acceleration component separation unit 22, the period specifying unit 23, the deceleration vector calculation unit 24, the coordinate system conversion unit 25, and the advancement direction determination unit 26 are achieved by a CPU (Central Processing Unit) and a memory which are provided in the advancement direction calculation device 2.

The absolute azimuth acquisition means 21, the acceleration component separation unit 22, the period specifying unit 23, the deceleration vector calculation unit 24, the coordinate system conversion unit 25, and the advancement direction determination unit 26 are illustrated in FIG. 5 as functional blocks that are independent from each other, but are able to be achieved also as software of one MCU (micro controller unit).

(Flow of Advancement Direction Determination Method)

A flow of a method of determining an advancement direction of a user by the absolute azimuth acquisition means 21, the acceleration component separation unit 22, the period specifying unit 23, the deceleration vector calculation unit 24, the coordinate system conversion unit 25, and the advancement direction determination unit 26 will be described with reference to FIGS. 6 and 7. FIG. 6 is a view illustrating a relation between the XYZ coordinate system and an X'Y'Z'U coordinate system. FIG. 7 is a flowchart illustrating the flow of the method of determining an advancement direction of a user.

Figure 7:
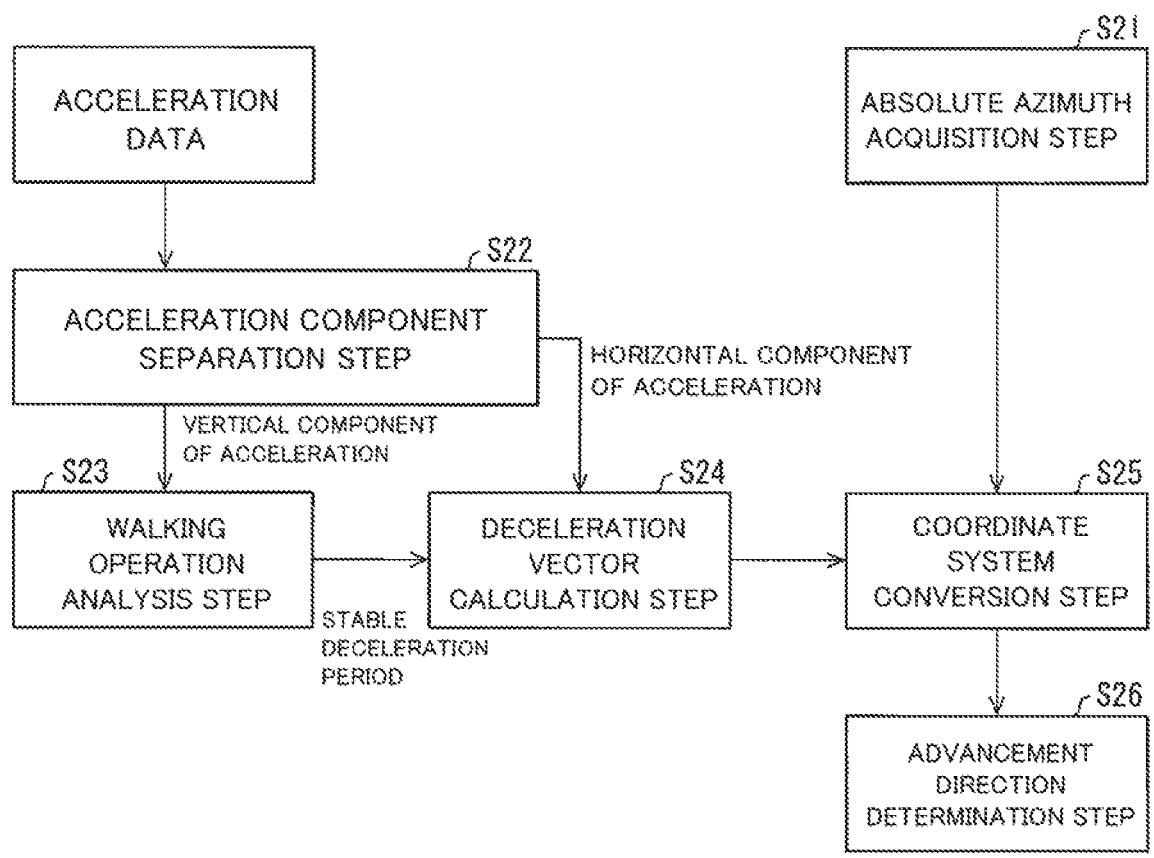
FIG. 7 is a flowchart illustrating a flow of an advancement direction determination method according to Embodiment 2.

As illustrated in FIG. 7, the method of determining an advancement direction of a user includes steps S21 to S26. Among steps S21 to S26, step of analyzing a walking operation (S23) is the same as S2 that is described in Embodiment 1 described above. Step of calculating a deceleration vector (S24) is the same as S that is described in Embodiment 1 describe above. Moreover, step of determining an advancement direction (S26) is the same as S4 that is described in Embodiment 1 described above. Accordingly, details of each step of only S21, S22, and S25 will be described below in order.

[S21. Acquisition of Absolute Azimuth]

As indicated by S21 in FIG. 7, the absolute azimuth acquisition means 21 specifies an absolute azimuth, that is, directions of north, south, east, and west and the vertical direction. For example, the absolute azimuth acquisition means 21 may acquire geomagnetism data from a geomagnetism sensor (not illustrated), or may search an image, which is photographed with use of a camera (not illustrated), for a building or the like, which is a landmark, by image recognition processing. Alternatively, the absolute azimuth acquisition means 21 may acquire information of the absolute azimuth from an outside. In any configuration, the absolute azimuth acquisition means 21 is able to easily acquire the information of the absolute azimuth from an information source.

[S22. Separation of Acceleration Component (Acceleration Component Separation Step)]

As indicated by S22 in FIG. 7, the acceleration component separation unit 22 acquires acceleration data (hereinafter, called an acceleration vector) from the acceleration sensor 20 when the user is at rest. As described in Embodiment 1 described above, the acceleration vector when the user is at rest includes only a vertical component. Accordingly, the acceleration component separation unit 22 is able to specify the vertical direction on the basis of a direction of the acceleration vector when the user is at rest. The acceleration component separation unit 22 separates the vertical component and a horizontal component of the acceleration vector with use of a rotating matrix represented by the following mathematical formula (2).

mathematical formula (2)

$$\begin{pmatrix} Ax' \\ Ay' \\ Az' \end{pmatrix} = \begin{bmatrix} \cos\theta\cos\varphi & -\sin\varphi & \sin\theta\cos\varphi \\ \cos\theta\sin\varphi & \cos\varphi & \sin\theta\sin\varphi \\ -\sin\theta & 0 & \cos\theta \end{bmatrix} \begin{pmatrix} Ax \\ Ay \\ Az \end{pmatrix} \quad [\text{Math. 2}]$$

In a left side of the mathematical formula (2), (Ax, Ay) is the horizontal component of the acceleration vector and Az is the vertical component of the acceleration vector. A pitch (θ) of the mathematical formula (2) expresses a difference between the Z-axis and a U-axis. A roll (φ) of the mathematical formula (2) expresses a difference between the X-axis and an X'-axis. Note that, the rotating matrix represented by the mathematical formula (2) corresponds to a case where the yaw (ψ) is set as 0° in the rotating matrix represented by the mathematical formula (1) that is described in Embodiment 1 described above.

The acceleration component separation unit 22 transmits data of the acceleration vector, which is separated into the vertical component and the horizontal component in this manner, to the period specifying unit 23 and the deceleration vector calculation unit 24.

As described in Embodiment 1 described above, the period specifying unit 23 calculates a stable deceleration period on the basis of the vertical component of the acceleration vector (S23). Then, the period specifying unit 23 transmits information of the calculated stable deceleration period to the deceleration vector calculation unit 24.

The deceleration vector calculation unit 24 calculates a deceleration vector on the basis of the stable deceleration period which is calculated by the period specifying unit 23 and the horizontal component (Ax, Ay) of the acceleration vector, which is acquired from the acceleration component separation unit 22 (S24). A direction of the deceleration vector is coincident with the advancement direction of the user in the stable deceleration period. The deceleration vector calculation unit 24 transmits information of the calculated deceleration vector to the coordinate system conversion unit 25.

[S25, Coordinate conversion]

As indicated by S25 in FIG. 7, the coordinate system conversion unit 25 acquires the information of the deceleration vector from the deceleration vector calculation unit 24. Moreover, the coordinate system conversion unit 25 acquires information of a yaw (ψ) from the absolute azimuth acquisition means 21. The yaw (ψ) indicates a difference between the Y-axis and a Y'-axis. The coordinate system conversion unit 25 converts a deceleration vector (Vx, V) in an XY coordinate system into a deceleration vector (Vx', Vy') in the X'Y'coordinate system with use of a rotating matrix represented by the following mathematical formula (3), mathematical formula (3)

$$\begin{pmatrix} Vx' \\ Vy' \end{pmatrix} = \begin{bmatrix} \cos\psi & -\sin\psi \\ \sin\psi & \cos\psi \end{bmatrix} \begin{pmatrix} Vx \\ Vy \end{pmatrix} \quad [\text{Math. 3}]$$

The coordinate system conversion unit 25 transmits information of the deceleration vector subjected to the coordinate conversion to the advancement direction determination unit 26. The advancement direction determination unit 26 determines the advancement direction of the user on the basis of the deceleration vector (Vx', Vy') acquired from the coordinate system conversion unit 25 (S26). Specifically, the advancement direction determination unit 26 specifies a direction opposite to a direction of the deceleration vector (Vx', Vy') as the advancement direction of the user. Moreover, the advancement direction determination unit 26 is able to calculate a length of the deceleration vector (Vx', Vy') as a moving distance of the user.

According to the configuration of Embodiment 2 described here, it is possible to determine an advancement direction of a user with use of a process and a means which are different from those of the method described in Embodiment 1. In particular, according to the configuration of Embodiment 2 described here, a geomagnetism sensor is not required to be used for separating a vertical component and a horizontal component of an acceleration vector as in the configuration of Embodiment 1 described above.

Embodiment 3

(Implementation Example by Software)

Control blocks (particularly, the coordinate conversion unit 12, the period specifying unit 13, the deceleration vector calculation unit 14, and the advancement direction determination unit 15) of the advancement direction calculation device 1 may be implemented by a logic circuit (hardware) formed in an integrated circuit (IC chip) or the like may be implemented by software with use of a CPU (Central Processing Unit). Similarly, control blocks (particularly, the acceleration component separation unit 22, the period specifying unit 23, the deceleration vector calculation unit 24, the coordinate system conversion unit 25, and the advancement direction determination unit 26) of the advancement direction calculation device 2 may be implemented by a logic circuit (hardware) formed in an integrated circuit (IC chip)

or the like or may be implemented by software with use of a CPU (Central Processing Unit).

In the latter case, the advancement direction calculation device 1, 2 includes the CPU that executes a command of a program that is software implementing each function, a ROM (Read Only Memory) or a storage device (each of which is referred to as a "recording medium") in each of which the program and various kinds of data are recorded so as to be readable by a computer (or the CPU), a RAM (Random Access Memory) that develops the program, and the like. When the computer (or the CPU) reads the program from the recording medium and executes the program, an object of the invention is achieved. As the recording medium, a "non-transitory tangible medium", for example, such as a tape, a disk, a card, a semiconductor memory, or a programmable logic circuit is able to be used. Moreover, the program may be supplied to the computer via any transmission medium (such as a communication network or a broadcast wave) which allows the program to be transmitted. Note that, an aspect of the invention can also be implemented in a form of a data signal in which the program is embodied through electronic transmission and which is embedded in a carrier wave.

[Conclusion]

An advancement direction calculation device (1, 2) according to an aspect 1 of the invention includes: an acceleration sensor (10, 20) that detects acceleration of three-axis directions, which is generated by a user; a period specifying unit (13, 23) that specifies at least a part of a deceleration period, during which a horizontal component of the acceleration detected by the acceleration sensor is negative, as a stable deceleration period on the basis of a change of a vertical component of the acceleration detected by the acceleration sensor; a deceleration vector calculation unit (14, 24) that calculates a deceleration vector which indicates a deceleration direction of the user in a horizontal plane in the stable deceleration period specified by the period specifying unit; and an advancement direction determination unit (15, 26) that determines an advancement direction of the user on the basis of the deceleration vector calculated by the deceleration vector calculation unit.

According to the aforementioned configuration, it is possible to calculate the deceleration vector from the horizontal component of the acceleration in the stable deceleration period. The deceleration vector calculated in this manner indicates in which direction in the horizontal plane the user decelerates.

A shake of a body of the user or the like is to cause generation of acceleration that has nothing to do with advancement. However, according to the aforementioned configuration, it is possible to specify the stable deceleration period, in which the acceleration that has nothing to do with advancement is little, on the basis of the change of the vertical component of the acceleration. Thus, it is possible to calculate, with high accuracy, the advancement direction of the user on the basis of the deceleration vector in the stable deceleration period.

In the advancement direction calculation device according to an aspect 2 of the invention, in the aspect 1, the period specifying unit may specify, on the basis of the change of the vertical component of the acceleration, a first time point at which one foot of the user lands and a second time point at which the other foot of the user takes off, and specify a period from the specified first time point to the specified second time point as the stable deceleration period.

According to the aforementioned configuration, in the stable deceleration period, since both feet of the user land, acceleration which is caused by a shake of a body of the user or the like and has nothing to do with advancement is little. Therefore, noise of the deceleration vector, which is based on the shake of the body of the user or the like, is small in the stable deceleration period, so that it is possible to calculate, with high accuracy, the advancement direction of the user on the basis of the deceleration vector in the stable deceleration period.

In the advancement direction calculation device according to an aspect 3 of the invention, in the aspect 2, in the stable deceleration period, the period specifying unit may specify a time point, at which the vertical component of the acceleration has a first local maximum value, as the first time point and specify a time point, at which the vertical component of the acceleration has a second local maximum value, as the second time point. According to the aforementioned configuration, it is possible to specify the stable deceleration period, during which both feet of the user land, on the basis of a local maximum value (peak which projects upward) of the vertical component of the acceleration.

In the advancement direction calculation device according to an aspect 4 of the invention, in any of the aspects 1 to 3, the deceleration vector calculation unit may calculate the deceleration vector by integrating the horizontal component of the acceleration in the stable deceleration period. According to the aforementioned configuration, it is possible to calculate the deceleration vector in the stable deceleration period with high accuracy.

In the advancement direction calculation device according to an aspect 5 of the invention, in any of the aspects 1 to 4, the advancement direction determination unit may determine a direction opposite to a direction of the deceleration vector as the advancement direction of the user. According to the aforementioned configuration, by using a fact that the advancement direction of the user is opposite to the deceleration direction in the stable deceleration period, it is possible to determine the advancement direction of the user on the basis of the direction of the deceleration vector.

The advancement direction calculation device according to an aspect 6 of the invention may further includes: a geomagnetism sensor (11); and a coordinate system conversion unit (coordinate conversion unit 12) that converts a coordinate system of the acceleration detected by the acceleration sensor into a coordinate system including a vertical axis and two axes in a horizontal direction on the basis of a direction of geomagnetism detected by the geomagnetism sensor, and the period specifying unit may specify the stable deceleration period on the basis of a vertical component of the acceleration the coordinate system of which is converted by the coordinate system conversion unit, in any of the aspects 1 to 5. According to the aforementioned configuration, by converting the coordinate system of the acceleration, it is possible to separate the acceleration of the three-axis directions, which is detected by the acceleration sensor, into the vertical component and a horizontal component. Then, it is possible to specify the stable deceleration period on the basis of the separated vertical component of the acceleration.

The advancement direction calculation device according to an aspect 7 of the invention may further include: an azimuth information acquisition unit (absolute azimuth acquisition means 21); and a coordinate system conversion unit (25) that converts a coordinate system of the deceleration vector calculated by the deceleration vector calculation unit into a coordinate system including a vertical axis and two axes in a horizontal direction on the basis of information of an azimuth acquired by the azimuth information acquisition unit, and the advancement direction determination unit may determine the advancement direction of the user on the basis of the deceleration vector the coordinate system of which is converted by the coordinate system conversion unit, in any of the aspects to 1 to 5. According to the aforementioned configuration, it is possible to calculate an offset of the coordinate system before the coordinate conversion and the coordinate system after the coordinate conversion in advance on the basis of the information of the azimuth acquired by the azimuth information acquisition unit, and convert the coordinate system of the deceleration vector on the basis of a result of the calculation. By converting the coordinate system of the acceleration, it is possible to separate the deceleration vector into a vertical component and a horizontal component. Then, it is possible to determine the advancement direction of the user on the basis of the separated horizontal component of the deceleration vector.

An advancement direction determination method according to an aspect 8 of the invention is an advancement direction determination method performed by an advancement direction calculation device (1, 2) including an acceleration sensor (10, 20) that detects acceleration of three-axis directions, which is generated by a user, and includes: a walking operation analysis step of specifying at least a part of a deceleration period, during which a horizontal component of the acceleration detected by the acceleration sensor is negative, as a stable deceleration period on the basis of a change of a vertical component of the acceleration detected by the acceleration sensor; a deceleration vector calculation step of calculating a deceleration vector which indicates a deceleration direction of the user in a horizontal plane in the stable deceleration period specified at the walking operation analysis step; and an advancement direction determination step of determining an advancement direction of the user on the basis of the deceleration vector calculated at the deceleration vector calculation step. According to the aforementioned configuration, an effect similar to that of the advancement direction calculation device according to the aspect 1 is exerted.

The advancement direction determination method according to an aspect 9 of the invention may further include an acceleration component separation step of separating the vertical component and the horizontal component of the acceleration detected by, the acceleration sensor, and, at the walking operation analysis step, the vertical component of the acceleration, which is separated at the acceleration component separation step, may be acquired and the stable deceleration period may be specified on the basis of a change of the acquired vertical component of the acceleration, in the aspect 8.

In the advancement direction determination method according to an aspect 10 of the invention, in the aspect 8 or 9, a period from a first time point at which one foot of the user lands to a second time point at which the other foot of the user takes off may be specified as the stable deceleration period at the walking operation analysis step. According to the aforementioned configuration, an effect similar to that of the advancement direction calculation device according to the aspect 2 is exerted.

In the advancement direction determination method according to an aspect 11 of the invention, in the aspect 10, in the stable deceleration period, a time point, at which the vertical component of the acceleration has a first local maximum value, may be specified as the first time point and a time point, at which the vertical component of the acceleration has a second local maximum value, may be specified as the second time point at the walking operation analysis step. According to the aforementioned configuration, an effect similar to that of the advancement direction, calculation device according to the aspect 3 is exerted.

In the advancement direction determination method according to an aspect 12 of the invention, in any of the aspects 8 to 11, at the deceleration vector calculation step, the deceleration vector may be calculated by integrating the horizontal component of the acceleration in the stable deceleration period. According to the aforementioned configuration, an effect similar to that of the advancement direction calculation device according to the aspect 4 is exerted.

In the advancement direction determination method according to an aspect 13 of the invention, in any of the aspects 8 to 12, at the advancement direction determination step, a direction opposite to a direction of the deceleration vector may be determined as the advancement direction of the user, According to the aforementioned configuration, an effect similar to that of the advancement direction calculation device according to the aspect 5 is exerted, The advancement direction calculation device according to each of the aspects of the invention may be achieved by a computer. In this case, a control program of the advancement direction calculation device, which causes the computer to operate as each unit (software element) provided in the advancement direction calculation device and thereby achieves the advancement direction calculation device by the computer, and a computer readable recording medium which records the control program are also included in the scope of the invention.

The invention is not limited to each of the embodiments described above, and may be modified in various manners within the scope indicated in the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST 1,2 advancement direction calculation device
10, 20 acceleration sensor
11 geomagnetism sensor
12 coordinate conversion unit (wordily to system conversion unit)
13, 23 period specifying unit
14, 24 deceleration vector calculation unit
15, 26 advancement direction determination unit
21 absolute azimuth acquisition means (azimuth information acquisition unit)
25 coordinate system conversion unit
S1 coordinate system conversion step
S2, S23 walking operation analysis step
S3, S24 deceleration vector calculation step
S4, S26 advancement direction determination step

The invention claimed is:
1. An advancement direction calculation device comprising:
an acceleration sensor that detects acceleration of three-axis directions, which is generated by a user;
a period specifying unit that specifies at least a part of a deceleration period, during which a horizontal component of the acceleration detected by the acceleration sensor is negative, as a stable deceleration period, during which both feet of the user land, on a basis of a change of a vertical component of the acceleration detected by the acceleration sensor;
a deceleration vector calculation unit that calculates a deceleration vector which indicates a deceleration direction of the user in a horizontal plane in the stable deceleration period specified by the period specifying unit; and
an advancement direction determination unit that determines an advancement direction of the user on a basis of the deceleration vector calculated by the deceleration vector calculation unit,
wherein the period specifying unit specifies, on a basis of the change of the vertical component of the acceleration, a first time point at which one foot of the user lands and a second time point at which another foot of the user takes off, and specifies a period from the specified first time point to the specified second time point as the stable deceleration period.

2. The advancement direction calculation device according to claim 1, wherein, in the stable deceleration period, the period specifying unit specifies a time point, at which the vertical component of the acceleration has a first local maximum value, as the first time point and specifies a time point, at which the vertical component of the acceleration has a second local maximum value, as the second time point.

3. The advancement direction calculation device according to claim 1, wherein the deceleration vector calculation unit calculates the deceleration vector by integrating the horizontal component of the acceleration in the stable deceleration period.

4. The advancement direction calculation device according to claim 1, wherein the advancement direction determination unit determines a direction opposite to a direction of the deceleration vector as the advancement direction of the user.

5. The advancement direction calculation device according to claim 1, further comprising:
a geomagnetism sensor; and
a coordinate system conversion unit that converts a coordinate system of the acceleration detected by the acceleration sensor into a coordinate system including one axis in a vertical direction and two axes in a horizontal direction on a basis of a direction of geomagnetism detected by the geomagnetism sensor, wherein
the period specifying unit specifies the stable deceleration period on a basis of a vertical component of the acceleration the coordinate system of which is converted by the coordinate system conversion unit.

6. The advancement direction calculation device according to claim 1, further comprising:
an azimuth information acquisition unit; and
a coordinate system conversion unit that converts a coordinate system of the deceleration vector calculated by the deceleration vector calculation unit into a coordinate system including one axis in a vertical direction and two axes in a horizontal direction on a basis of information of an azimuth acquired by the azimuth information acquisition unit, wherein
the advancement direction determination unit determines the advancement direction of the user on a basis of the deceleration vector the coordinate system of which is converted by the coordinate system conversion unit.

7. An advancement direction determination method performed by an advancement direction calculation device including an acceleration sensor that detects acceleration of three-axis directions, which is generated by a user, the advancement direction determination method comprising:

a walking operation analysis step of specifying at least a part of a deceleration period, during which a horizontal component of the acceleration detected by the acceleration sensor is negative, as a stable deceleration period, during which both feet of the user land, on a basis of a change of a vertical component of the acceleration detected by the acceleration sensor;
a deceleration vector calculation step of calculating a deceleration vector which indicates a deceleration direction of the user in a horizontal plane in the stable deceleration period specified at the walking operation analysis step; and
an advancement direction determination step of determining an advancement direction of the user on a basis of the deceleration vector calculated at the deceleration vector calculation step,
wherein a period from a first time point at which one foot of the user lands to a second time point at which another foot of the user takes off is specified as the stable deceleration period at the walking operation analysis step.

8. The advancement direction determination method according to claim 7, wherein, in the stable deceleration period, a time point, at which the vertical component of the acceleration has a first local maximum value, is specified as the first time point and a time point, at which the vertical component of the acceleration has a second local maximum value, is specified as the second time point at the walking operation analysis step.

9. The advancement direction determination method according to claim 7, wherein, at the deceleration vector calculation step, the deceleration vector is calculated by integrating the horizontal component of the acceleration in the stable deceleration period.

10. The advancement direction determination method according to claim 7, wherein, at the advancement direction determination step, a direction opposite to a direction of the deceleration vector is determined as the advancement direction of the user.

11. The advancement direction determination method according to claim 7, further comprising
an acceleration component separation step of separating the vertical component and the horizontal component of the acceleration detected by the acceleration sensor, wherein
at the walking operation analysis step, the vertical component of the acceleration, which is separated at the acceleration component separation step, is acquired and the stable deceleration period is specified on a basis of a change of the acquired vertical component of the acceleration.

12. A non-transitory computer readable storage medium storing a control program for causing an advancement direction determination action performed by an advancement direction calculation device including an acceleration sensor that detects acceleration of three-axis directions, which is generated by a user, wherein
the control program makes the computer act as:
a period specifying unit that specifies at least a part of a deceleration period, during which a horizontal component of the acceleration detected by the acceleration sensor is negative, as a stable deceleration period, during which both feet of the user land, on a basis of a change of a vertical component of the acceleration detected by the acceleration sensor;
a deceleration vector calculation unit that calculates a deceleration vector which indicates a deceleration direction of the user in a horizontal plane in the stable deceleration period specified by the period specifying unit; and an advancement direction determination unit that determines an advancement direction of the user on a basis of the deceleration vector calculated by the deceleration vector calculation unit, wherein the period specifying unit specifies, on a basis of the change of the vertical component of the acceleration, a first time point at which one foot of the user lands and a second time point at which another foot of the user takes off, and specifies a period from the specified first time point to the specified second time point as the stable deceleration period.

* * * * *